United States Patent
Keegan et al.

(10) Patent No.: US 10,462,365 B1
(45) Date of Patent: Oct. 29, 2019

(54) LOW POWER SURVEILLANCE SYSTEM

(71) Applicant: HRL Laboratories, LLC, Malibu, CA (US)

(72) Inventors: Matthew S Keegan, Santa Monica, CA (US); Kang-Yu Ni, Calabasas, CA (US); Shankar R. Rao, Agoura Hills, CA (US)

(73) Assignee: HRL Laboratories, LLC, Malibu, CA (US)

(*) Notice: Subject to any disclaimer, the term of this patent is extended or adjusted under 35 U.S.C. 154(b) by 482 days.

(21) Appl. No.: 14/452,807

(22) Filed: Aug. 6, 2014

Related U.S. Application Data

(63) Continuation-in-part of application No. 14/209,136, filed on Mar. 13, 2014, now Pat. No. 9,544,550.

(60) Provisional application No. 61/783,538, filed on Mar. 14, 2013, provisional application No. 61/863,351, filed on Aug. 7, 2013.

(51) Int. Cl.
G06T 7/194 (2017.01)
H04N 5/232 (2006.01)
H04N 7/18 (2006.01)
G06K 9/32 (2006.01)
(Continued)

(52) U.S. Cl.
CPC ..... H04N 5/23241 (2013.01); G06K 9/00771 (2013.01); G06K 9/3241 (2013.01); G06T 7/0081 (2013.01); G06T 7/194 (2017.01); H04N 7/183 (2013.01); G06T 2207/10016 (2013.01);
(Continued)

(58) Field of Classification Search
CPC ................................ H04N 7/18; G06T 7/194
See application file for complete search history.

(56) References Cited

U.S. PATENT DOCUMENTS 8,411,931 B2 * 4/2013 Zhou ................. H04N 13/0029
375/240.16
2004/0131249 A1 7/2004 Sandrew
(Continued)

OTHER PUBLICATIONS

Ronald Larcom and Thayne R. Coffman, "Foveated Image Formation through Compressive Sensing", SSIAI 2010.*
(Continued)

Primary Examiner — Jorge L Ortiz Criado
Assistant Examiner — Kyle M Lotfi
(74) Attorney, Agent, or Firm — Tope-McKay & Associates

(57) ABSTRACT

A system and method for low power surveillance. The system receives a series of frames from a camera, each frame having a background and a foreground. A background template is generated. Thereafter, the system receives a new image frame of the scene, the new image frame having a background and a foreground. Potential regions of interest (ROI) are detected in the new image frame. Initial region descriptors are determined in the potential ROI in the foreground. The initial region descriptors are segmented to generate a segmented region. Region descriptors are re-determined from the segmented region. A contiguous sparse foreground is determined from the re-determined region descriptors, the contiguous sparse foreground being a contiguous ROI. The ROI is reconstructed using foveated compressive sensing to generate an image of an interesting object. Finally, the interesting object image is combined with the background template to reconstruct the foreground.

24 Claims, 4 Drawing Sheets

(51) Int. Cl.
G06T 7/00 (2017.01)
G06K 9/00 (2006.01)
(52) U.S. Cl.
CPC ............... G06T 2207/20144 (2013.01); G06T 2207/30232 (2013.01)

(56) References Cited

U.S. PATENT DOCUMENTS

| | | |
|---|---|---|
| 2007/0183661 A1 | 8/2007 | El-Maleh |
| 2010/0067782 A1 | 3/2010 | Dunn |
| 2011/0090341 A1* | 4/2011 | Ikewada .......... G08B 13/19608 348/152 |
| 2012/0027248 A1 | 2/2012 | Feris |

OTHER PUBLICATIONS

Charles Guyon, Thierry Bouwmans, and El-Hadi Zahzah, "Foreground Detection by Robust PCA Solved via a Linearized Alternating Direction Method.", ICIAR 2012, Part I, LNCS 7324, pp. 115-122, 2012.*

Xiaowei Zhou, Can Yang and Weichuan Yu, "Moving Object Detection by Detecting Contiguous Outliers in the Low-Rank Representation", Jun. 26, 2012.*

Manya V. Afonso et al. "Fast Image Recovery Using Variable Splitting and Constrained Optimization." IEEE Transactions on Image Processing, vol. 19, No. 9, Sep. 2010.*

E. Candes, X. Li, Y. Ma, and J. Wright, "Robust Principal Component Analysis?", IEEE PAMI 2011.

Y. Peng, A. Ganesh, J. Wright, W. Xu, and Y. Ma, "RASL: Robust Alignment by Sparse and Low-rank Decomposition for Linearly Correlated Images", IEEE PAMI 2011.

A. Waters, A. Sankaranarayanan, and R. Baraniuk. SparCS: Recovering low-rank and sparse matrices from compressive measurements. NIPS, 2011.

J. Wright, A. Ganesh, K. Min, and Y. Ma. Compressive Principal Component Pursuit, ISIT, 2012.

Candes, E., et al., "Robust Principal Component Analysis?" IEEE PAMI 2011.

Chan T.F., et al., "Active contours without edges," IEEE Transactions on Image Processing. 10(2):266-277, 2001.

Goldstein, T., et al., "Geometric applications of the split bregman method: Segmentatioon and surface reconstrucion." J. Sci. Comput., 45(1-3):272-293, 2010.

Nikolova, M., et al., "Algorithms for finding global minimizers of image segmentation and denoising models," SIAM J. App. Math., 66(5): 1632-1648, 2006.

Peng, Y., et al., "RASL: Robust Alignment by Sparse and Low-rank Decomposition for Linearly Correlated Images," IEEE PAMI, 2011.

Waters, A., et al., "SparCS: Recovering low-rank and sparse matrices from compressive measurements," NIPS, 2011.

Wright, J., et al., "Compressive Principal Component Pursuit," ISIT, 2012.

Yang, J., et al., "Alternating direction algorithms for l1-problems in compressive sensing" SIAM J. Sci. Comput., 33(1):250-278, 2011.

Zou, H., et al., "Regularization and variable selection via the elastic net," Journal of the Royal Statistical Society Series B, 67:301-320, 205, (2005).

Office Action 1 for U.S. Appl. No. 14/209,136, dated Apr. 6, 2016.
Response to Office Action 1 for U.S. Appl. No. 14/209,136, dated Jul. 17, 2015.
Notice of Allowance for U.S. Appl. No. 14/209,136, dated Aug. 31, 2016.
Ciocoiu. "Foveated compressed sensing" 20th European conference on Circuit Theory and Design 2011.

* cited by examiner

LOW POWER SURVEILLANCE SYSTEM

CROSS-REFERENCE TO RELATED APPLICATIONS

This is a Continuation-in-Part application of U.S. application Ser. No. 14/209,136, filed on Mar. 13, 2014, entitled, "Low Power Surveillance Camera for Intruder Detection," which is a non-provisional application of U.S. Provisional Application No. 61/783,538, filed on Mar. 14, 2013, entitled, "Low Power Surveillance Camera for Intruder Detection."

This is ALSO a non-provisional application of U.S. Provisional Application No. 61/863,351, filed on Aug. 7, 2013, titled, "L1 Methods for Low Power Surveillance."

FIELD OF INVENTION

The present invention relates to surveillance system and, more particularly, to a low power surveillance camera system.

BACKGROUND OF INVENTION

Surveillance cameras typically are stationary or have controllable motions, such as pan, tilt, and zoom. Therefore, the background scene can be considered stationary. Conventionally, surveillance videos are obtained by acquiring each pixel value (raster scan) of the scene with a stationary background over a long period of time. Such surveillance cameras create a massive amount of data and consume a lot of power. Since the background is stationary, power consumption can be reduced if only the moving foreground is measured. However, this is challenging because the location of the moving foreground can be arbitrary and usually unknown until the entire scene is acquired.

There are a few related works that detect foreground from a stationary background video. For example, the authors in Candes et al. show that the low-rank and sparse components of a matrix can be separated exactly by convex programming (see E. Candes, X. Li, Y. Ma, and J. Wright, "Robust Principal Component Analysis?", IEEE PAMI 2011). They demonstrate this in a video surveillance application in which they stack video frames as columns of a matrix, which can be decomposed into a low-rank component that represents the stationary background and a sparse component that represents moving objects. The process proposed by Candes et al. is entirely post-processing.

In Peng et al., Candes et al.'s work was extended by simultaneously aligning a batch of images that are linearly correlated and with corruption such as occlusion (see Y. Peng, A. Ganesh, Wright, W. Xu, and Y. Ma, "RASL: Robust Alignment by Sparse and Low-rank Decomposition for Linearly Correlated Images", IEEE PAMI 2011). Each column of the matrix, which is an image, finds an optimal transform so that the matrix can be decomposed into a low-rank component and a sparse component. This is also post processing and does not involve video acquisition.

Two groups have investigated the problem of low-rank and sparse recovery from compressive measurements. For example, Waters et al. introduced an effective alternating minimization algorithm for compressive low-rank and sparse recovery (see A. Waters, A. Sankaranarayanan, and R. Baraniuk. SparCS: Recovering low-rank and sparse matrices from compressive measurements. NIPS, 2011). Additionally, Wright et al. developed theoretical conditions under which compressive low-rank and sparse recovery can be solved with a convex optimization (see J. Wright, A. Ganesh, K. Min, and Y. Ma. Compressive Principal Component Pursuit, ISIT, 2012). However, these background modeling methods for compressive low-rank and sparse recovery can only process multiple video frames in batch fashion, limiting their application to real time video surveillance and are not designed to reduce the power consumption of the imaging system.

Thus, a continuing need exists for an efficient surveillance system that detects interesting targets and intruders without acquiring massive surveillance video data.

SUMMARY OF INVENTION

Described is a system, method, and computer program product for a low power surveillance camera system for intruder detection. The system, for example, includes one or more processors and a memory. The memory is a non-transitory computer-readable medium having executable instructions encoded thereon, such that upon execution of the instructions, the one or more processors performs several operations, such as receiving a series of frames from a camera, each frame having a background and a foreground. A background template is generated from the series of frames. Thereafter, the system receives a new image frame of the scene, the new image frame having a background and a foreground. Potential regions of interest (ROI) are detected in the foreground of the new image frame. Initial region descriptors are then determined in the potential ROI in the foreground of the new image frame. The initial region descriptors are segmented to generate a segmented region. Region descriptors are re-determined from the segmented region. A contiguous sparse foreground is then determined from the re-determined region descriptors, the contiguous sparse foreground being a contiguous ROI. The ROI is then reconstructed using foveated compressive sensing to generate an image of an interesting object. Finally, the interesting object image is combined with the background template to generate a reconstructed foreground.

In another aspect, in determining a contiguous sparse foreground from the re-determined region descriptors, the contiguous sparse foreground is determined using an alternating direction method.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
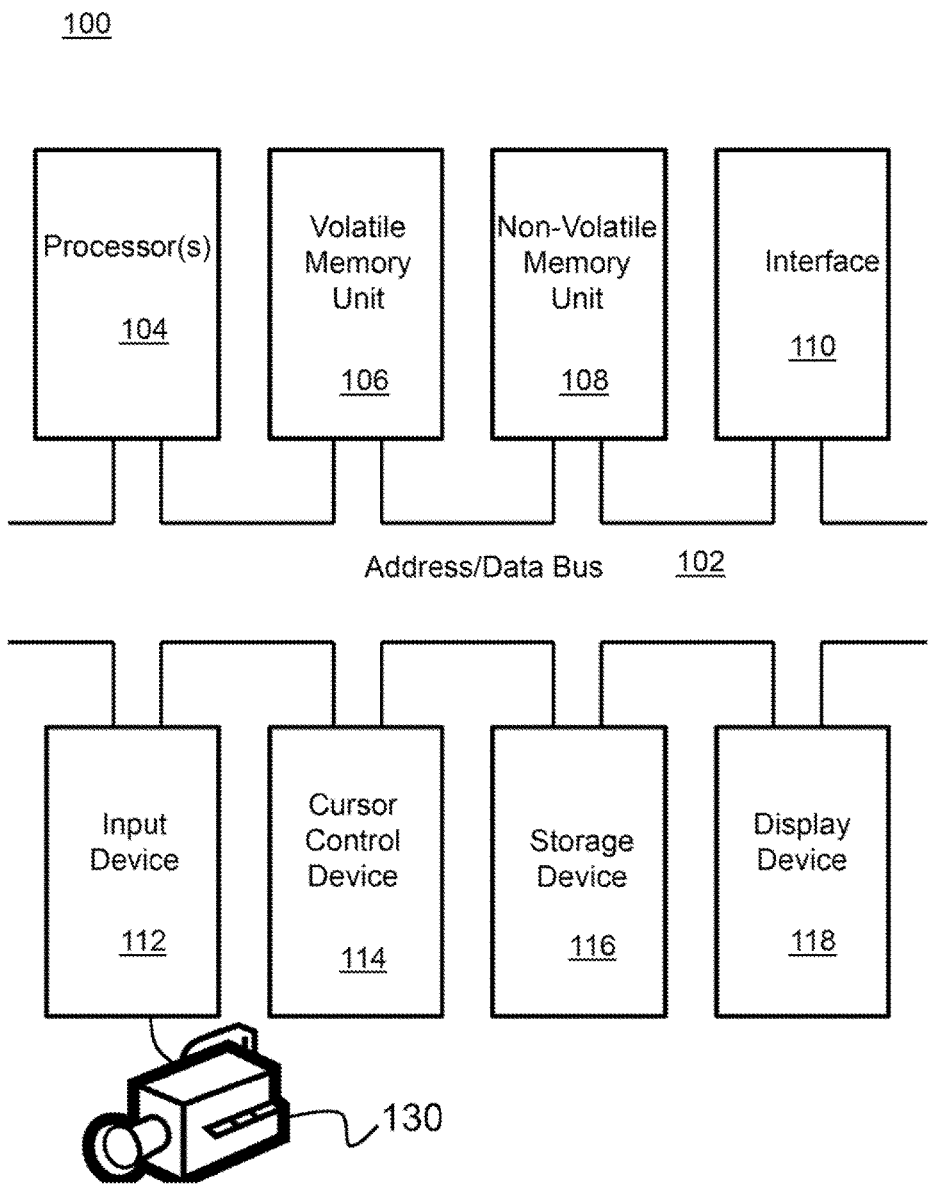
FIG. 1 is a block diagram depicting the components of a surveillance system according to the principles of the present invention.

The present invention relates to surveillance system and, more particularly, to a low power surveillance camera system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Next, specific details of the present invention are provided to give an understanding of the specific aspects. Finally, an example implementation is provided as an example of the system in operation.

(1) Principal Aspects

The present invention has three "principal" aspects. The first is a surveillance system. The system is typically in the form of a computer system operating software or in the form of a "hard-coded" instruction set. This system may include the relevant sensors (e.g., video cameras, still cameras, thermal imaging sensors, etc.) and may be incorporated into a wide variety of devices that provide different functionalities. The second principal aspect is a computer implemented method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device (or in combination with an alphanumeric input device), such as a video camera 130, camera, or any other sensor (or combination of input devices) as may be applicable or desired for a surveillance system. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112, or by receiving signals from the input device 112 (such as a camera 130), or any combination thereof. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
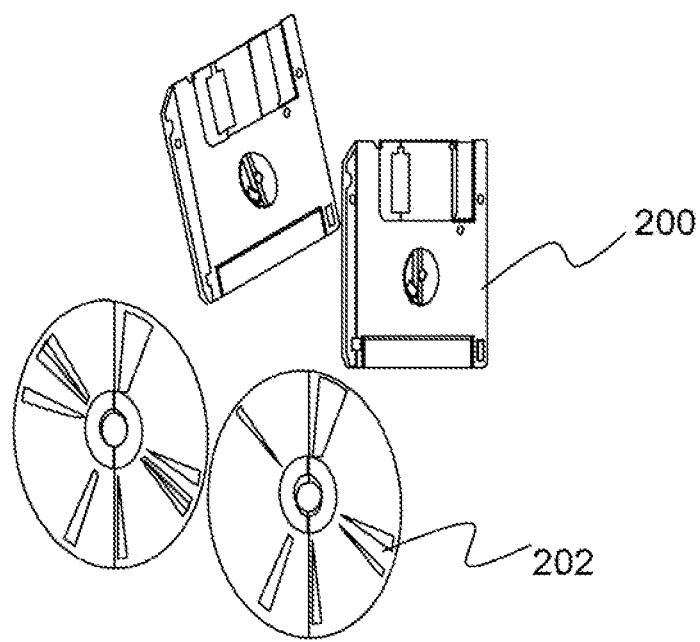
FIG. 2 is an illustration of a computer program product embodying an aspect of present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

As noted above, surveillance cameras typically are stationary or have controllable small motions, such as pan, tilt, and zoom. Therefore, the background scene can be considered stationary. Conventionally, surveillance videos are obtained by acquiring each pixel value (raster scan) of the scene with stationary background over a long period of time. This creates massive data and consumes a lot of power. Since the background is stationary, power consumption can be reduced if we only measure the moving foreground. However, this is challenging because the location of the moving foreground can be arbitrary and usually unknown until the entire scene is acquired. Thus, the system described herein addresses the need for an efficient surveillance system that detects interesting targets and intruders without acquiring massive surveillance video data.

Specifically, described is a system capable of detecting the moving foreground without acquiring individual pixel values while reducing power consumption (using the knowledge of the stationary background). In essence, the system minimizes the number of measurements required so that it does not depend on the size of the surveillance area. Advantages of the prior art include the ability to provide: robust background learning with known camera motion; efficient foreground detection that depends on the size of the interesting object (e.g., intruder), not the size of the surveillance area; efficient foreground reconstruction utilizing compressed sensing; and robust noise removal and contiguous foreground region detection avoid false alarms and improve object detection. The system can be implemented in many different types of imaging systems that employ persistent surveillance, such as factory monitoring, security systems, and active safety systems. In addition to reducing camera power consumption, the system can be implemented in smart cameras and intelligent imaging systems with reduced onboard memory storage requirements as well as reduce bandwidth needed to transmit video data.

As will be further understood below, the present invention is a modification of the invention described in U.S. application Ser. No. 14/209,136, filed on Mar. 13, 2014, entitled, "Low Power Surveillance Camera for Intruder Detection," (the '136 application), to which the present application claims priority. The '136 application describes a framework for intruder detection of a wide surveillance area with low power that is proportion to the size of the intruder, instead of the size of the surveillance area. Surveillance videos usually contain a stationary background and sparse events that are of interest over a long period of time, therefore creating massive redundant data. The system described herein extends that system by adding a sophisticated, numerical approach to finding large contiguous foreground regions (illustrated as 316 in FIG. 3) that correspond to interesting objects (e.g., intruders) and prevent false alarms. Specific details are provided below.

(3) Specific Details

Figure 3:
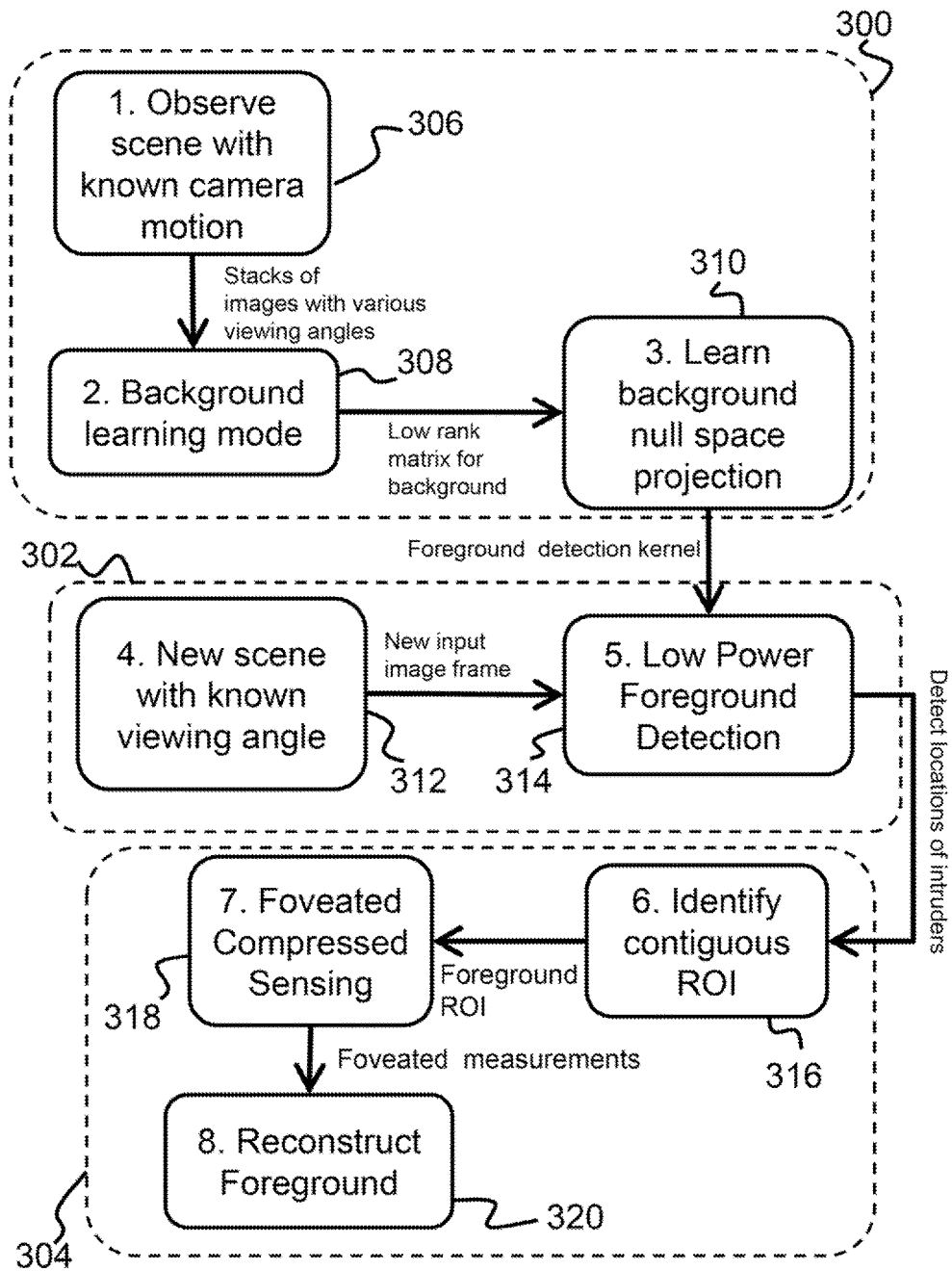
FIG. 3 is a flow chart depicting process flow of a low power surveillance system according to the principles of the present invention.

A flow chart illustrating process flow for a low power surveillance system is illustrated in FIG. 3. The system provides for foreground detection of a wide-area surveillance system with low power that is proportional to the size of foreground, instead of the size of the surveillance area. This is achievable since, in video data, the background is often characterized as low rank and the foreground is characterized as sparse. The system incorporates three unique aspects, including: (1) a background learning module that allows camera motion and learns the background; (2) a low power foreground detection module that incorporates the knowledge of the background; and (3) a foveated compressed sensing module that reconstructs interesting objects (e.g., intruders) in high-resolution with much reduced measurements.

In operation, the system proceeds through the following steps. First, using a sensor (e.g., camera) the system observes 306 the scene with a known camera motion (such as pan and tilt) to generate images with various viewing angles. Next, a background learning mode 308 is employed to generate a low rank matrix for the background in the images. The background null space projections are then learned 310, which, as a result, provides a foreground detection kernel. A new scene with known viewing angles is then obtained 312. For example, a new video stream is received into the system with a new input image frame. Based on the foreground detection kernel and the new input image frame, low power foreground detection 314 can be performed to detect foreground potential regions of interest (ROIs), such as intruders or other anomalous activity.

To filter out minimal foreground activity, the system identifies 316 contiguous ROIs to generate the foreground ROI. Focus measures are then employed on the ROIs using foveated compressed sensing 318 to generate foveated measurements. Based on the foveated measurements, the foreground is reconstructed 320 for presentation to a user. As noted above, the present application provides a new technique (over the '136 application) for identifying 316 contiguous ROIs to generate the foreground ROI. These aspects are described in further detail below.

(3.1) Background Learning

Sparse and low-rank decomposition (SLRD) is a set of provably optimal and efficient mathematical techniques for identifying and decomposing low-complexity structure of a scene from high-dimensional raw data. Such a technique was described in E. Candes, X. Li, Y. Ma, and J. Wright, "Robust Principal Component Analysis?", IEEE PAMI 2011, which is incorporated by reference as though fully set forth herein. Assume a stationary camera that is viewing scene for the task of intruder/foreground detection. If many raw image frames are obtained over the course of a day, each frame can be stacked as a column vector of the data matrix D, which can be decomposed to D=A+E, where A is the low-rank matrix that represents the background and E is the sparse matrix that represents the sparse foreground and deviations from the convex Lambertian model, e.g., shadows and reflection. The low-rank matrix A is extremely low-rank relative to the image size, the size of the columns in D. It has been shown that that the low-rank and sparse components of the data matrix D can be exactly decomposed by Principal Component Pursuit (PCP) (See Candes et al., 2011). The minimizer A provides a background template for a stationary camera.

If the camera is not stationary, the images need to be aligned in order to have a low-rank and sparse decomposition. This can be solved by Robust Alignment by Sparse and Low-rank Decomposition (RASL), which computes a set of transformations $\tau$ that align the images in D. RASL was described by Y. Peng, A. Ganesh, J. Wright, W. Xu, and Y. Ma, "RASL: Robust Alignment by Sparse and Low-rank Decomposition for Linearly Correlated Images", IEEE PAMI 2011, which is hereby incorporated by reference as though fully set forth herein. The RASL technique has been successful in aligning batches of images to get the background when the images are not aligned. As applicable to the invention described herein, since the camera motion is known, i.e. pan, tilt, and zoom are controllable; $\tau$ is a known variable, which simplifies the problem.

(3.2) Low Power Foreground Detection

Figure 4:
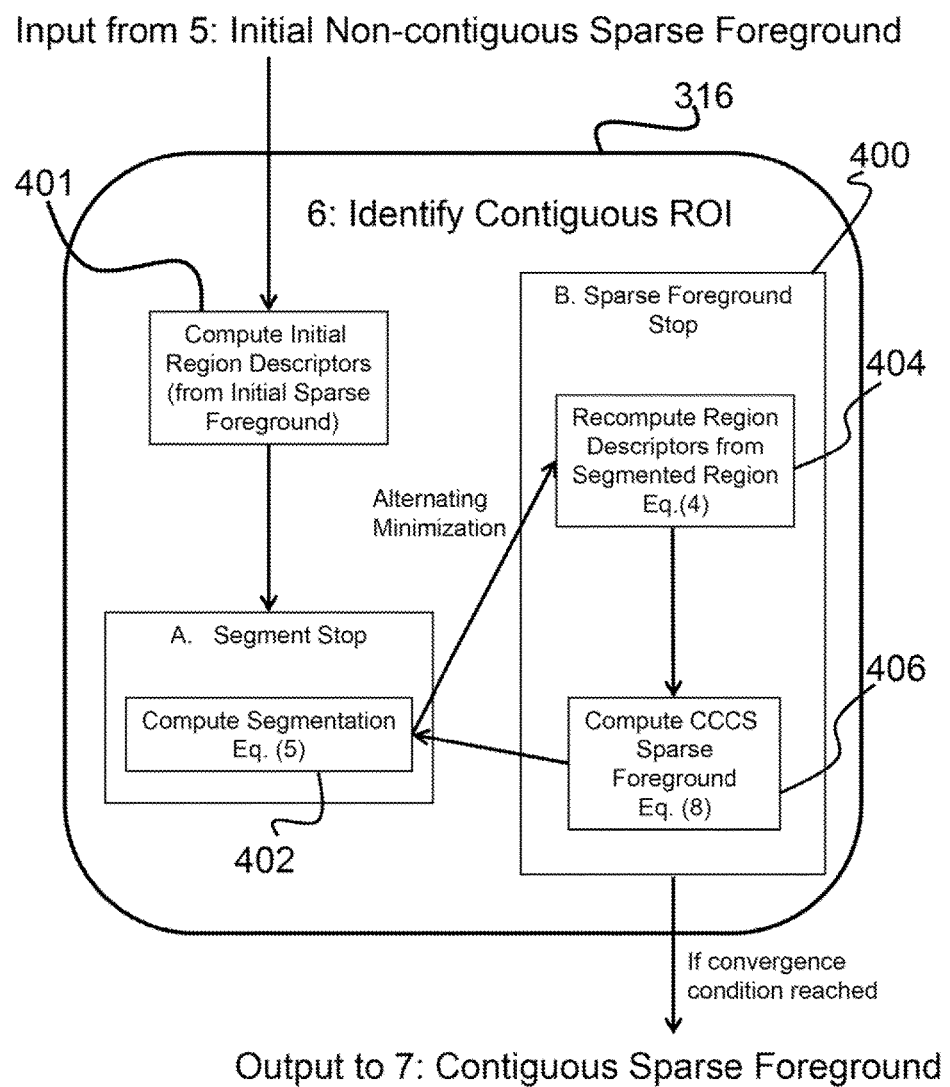
FIG. 4 is a flow chart depicting process flow for Step 6 of FIG. 3, according to the principles of the present invention.

Referring to FIG. 4, the system receives the initial non-contiguous sparse foreground and then computes initial region descriptors 401 as follows. Specifically, Equation 1 is used to compute the initial region descriptors 401, as detailed below.

Assuming that the system has learned the background A from D using PCP or RASL, let Q be the null space of A and $P_Q$, the projection matrix onto Q. Then, for a single raw image d, the measurements are $P_Q d = P_Q(\alpha + e) = P_Q \alpha + P_Q e = P_Q e$, where $\alpha$ and e are the low-rank background and sparse component, respectively. Therefore, the image is sparse in the projection matrix $P_Q$ representation, since e is the sparse component. The measurement matrix is then $\Phi = \Psi P_Q$, where $\Psi$ can be any CS matrix that is well conditioned, such as satisfying the restricted isometry property, which guarantees a unique sparse solution. For numerical efficiency, $\Psi$ can be chosen to be a subsampled Fourier matrix. Note that $\Phi = \Psi P_Q$ is close to well conditioned because the projection matrix $P_Q$ onto the high-dimensional null space of A is close to the identity matrix.

Therefore, the low-power foreground detection is directed to obtaining the measurements $y = \Phi d$, whose dimension is much smaller than the dimension of d. Since $y = \Phi d = \Phi \alpha + \Phi e = \Phi e$, the foreground is detected by the following convex optimization:

$$\min_e \|\Phi e - y\|_2 + \alpha \|e\|_1, \quad (1)$$

where the $l_1$ norm and $l_2$ norm are defined as $$\|x\|_1 \equiv \sum_i |x_i| \text{ and } \|x\|_2 \equiv \sqrt[2]{\sum_i x_i^2}$$

and, respectively. This can be solved fast by methods such as YALL1 or DALM. YALL1 is Your Algorithms for L1, a publicly available open source solver for sparse reconstruction as provided by Rice University and DALM refers to the method of Dual Augmented Lagrange Multipliers, another publicly available solver for sparse reconstruction. As understood by those skilled in the art, y is a vector of measurements of the input image and x is a variable used in the definition of the $l_1$ norm and $l_2$ norms above. A major benefit of the foreground detection method is that the number of measurements is proportional to the size of the intruder, the size of the support of e and does not depend on the size of the surveillance area, the size of d.

(3.3) Foveated Compressed Sensing 318 (Low Power Surveillance Using Contiguity-Constrained Compressive Sensing)

Regions-of-interest (ROI) in surveillance video are mostly large objects that occlude the background, such as intruders. It is to be expected that the portions of the sparse foreground component sourced from these objects are contiguous in the image domain and locally convex (i.e., contain few miniscule holes within their exterior boundary). Detected foreground pixels that are isolated can be safely ignored since they will mostly be attributed to local differences in illumination from the low-rank background, or from a lack of complete information caused by the subsampling described above.

The system also imposes a contiguity prior to avoid getting isolated pixels in the sparse component. The contiguity prior is a prior assumption that regions of interest (i.e. the foreground) is made up of contiguous sets of pixels and not individually distributed pixels. For example, let S=supp (e) denote the support of the sparse component e and $\|S\|_{TV} \equiv \Sigma_{i,j} |(\nabla S)_{i,j}|$ denote the total variation of S. This penalizes isolated pixels and favors contiguous regions. The contiguity prior is added to the foreground detection problem (i.e., Equation (1)) as the following:

$$\min_e \|\Phi e - y\|_2 + \alpha \|e\|_1 + \lambda \|S\|_{TV}. \quad (2)$$

Equation (2) is coined the contiguity-constrained compressive sensing (CCCS) model. The contiguity prior enforces an adjacency assumption on the non-zero portions of the signal.

Finding a solution to Equation (2) is difficult for a number of reasons. The dependence of S on e is both highly nonconvex and nonlinear. The dependence is also non-differentiable; a problem that level-set methods, used to handle such interface problems, mitigate by offering regularized indicator functions. An example of such a level-set method was described by T. F. Chan and L. A. Vese, in "Active contours without edges," IEEE Transactions on Image Processing, 10(2):266-277, 2001. However, such level-set methods are still highly nonconvex. Instead of such a level-set method, described below is an alternative approach that is at least component-wise convex.

(3.3.1) Split-Variable Correlation Method

The Split-Variable Correlation method is performed in box 316 (6. Identify contiguous ROI). Specifically, described in this section is a unique numerical approach to finding solutions to Equation 2. The system initiates the process by using a variable splitting u=S to separate the two non-differentiable terms, the total variation regularizer from the $l_1$ regularizer. Regularization refers to the process of applying prior knowledge or assumptions to the properties of a solution of a problem when the problem is ill-posed (i.e. when there is no unique solution) in order to select a solution. A regularizer is a term added to a problem that enforces these priors. Instead of enforcing the equality constraint using typical convex optimization techniques, the correlation is maximized between u and S recognizing the fact that for $u \in \{0,1\}$ this would enforce the equality independent of the other terms. S is approximated by the function f(e) which is chosen to simplify the minimization process, which is now written as:

$$\min_{e, u \in \{0,1\}} \frac{1}{2} \|\Phi e - y\|^2 + \alpha \|e\|_1 + \lambda \|u\|_{TV} + \gamma \langle 1 - u, f(e) \rangle. \quad (3)$$

One suitable example f is $f(e)=f_1(e)-f_2(e)$ where, in the case of grayscale images, $$f_1(e) = e^2 \text{ and } f_2(e) = \min_{i=1,\ldots,N}(e-c_i)^2. \quad (4)$$

The function $f_1(e)$ penalizes e=0 and $f_2(e)$ penalizes e≠0. The scalars $\{c_i\}_{i=1}^N$ are chosen as a small, discrete set to approximate the range of intensity values of the sparse non-zero portion of e. In the case of color images, the coordinates of e are grouped in triples corresponding to the color bands and the values of $c_i$ need also be grouped in triples. The definition of $f_2(e)$ above must be altered in this case to minimize appropriately over these triples.

Equation (2) can be solved (in box 316 of FIG. 3) via alternating direction minimization with respect to e and u respectively. The minimization with respect to u, is as follows:

$$\min_{u \in \{0,1\}} \lambda \|u\|_{TV} + \gamma \langle 1 - u, f(e) \rangle, \quad (5)$$

where the minimization with respect to u is a segmentation problem which has been shown to be solvable by a convex minimization. An example of a convex minimization was described by M. Nikolova, S. Esedoglu, and T. F. Chan, in "Algorithms for finding global minimizers of image segmentation and denoising models," SIAM J. App. Math., 66(5):1632-1648, 2006, which is hereby incorporated by reference as though fully set forth herein. The approach is to relax the feasible region to the convex set $\hat{u} \in [0,1]$, solve the resulting convex minimization and then find a global minimizer of Equation (5) by thresholding $u = \hat{\lambda} < \hat{u}$.

The minimization with respect to e can be written as $$\min_e \frac{1}{2} \|\Phi e - y\|^2 + \alpha \|e\|_1 + \gamma \|e - \bar{c}\|^2, \quad (6)$$

where $\bar{c}$ is computed pointwise on the image domain by, in the case of gray scale images, $$\bar{c} = \begin{cases} \mathrm{argmax}_{c=c_1,\ldots,c_N}(e(x)-c)^2 & \text{when } u(x) = 1, \\ 0 & \text{when } u(x) = 0. \end{cases} \quad (7)$$

The computation of $\bar{c}$ should be altered appropriately in the case of color images. This convex minimization is closely related to the "elastic net", a difference being that e is component-wise shrunk to the values of $\bar{c}$ instead of shrunk towards zero by the $l_2$ term (otherwise known as the ridge regression term). The "elastic net" was described by H. Zou and T. Hastie, in "Regularization and variable selection via the elastic net," Journal of the Royal Statistical Society Series B, 67:301-320, 2005, which is hereby incorporated by reference as though fully set forth herein.

However, a surveillance application is, in general, of far higher dimension than most regression applications, so the poor complexity of the ad hoc approaches used by the statistics community scale badly in performance. Instead, the system uses a unique approach in implementing Equation (6) in an augmented $l_1$-$l_2$ form (unconstrained $l_1$-denoising), as follows:

$$\min_e \frac{1}{2} \|\tilde{\Phi} e - \tilde{y}\|^2 + \alpha \|e\|_1, \quad (8)$$

where $\tilde{\Phi}$ is the overdetermined augmented operator, as follows:

$$\tilde{\Phi} = \begin{pmatrix} \Phi \\ \sqrt{2\gamma} I \end{pmatrix}, \quad (9)$$

with I the identity matrix, and $\tilde{\gamma}$ is the augmented signal, as follows:

$$\tilde{y} = \begin{pmatrix} y \\ \sqrt{2\gamma}\,\bar{c} \end{pmatrix}. \qquad (10)$$

e is determined from Equation (7) using an appropriate $l_1$-denoising solver. A flow chart of the process of alternating minimization used to compute u and e, respectively, is shown in FIG. 4. FIG. 4 demonstrates how the CCCS method fits into the Low-Power Surveillance system demonstrated in FIG. 3. As illustrated, the initial foreground is inputted from Step 5 (of FIG. 3). The contiguous foreground is then computed using alternating minimization (described above with respect to the Split-Variable Correlation Method). The output is the contiguous ROI to Step 7 (of FIG. 3)

As mentioned above, a solution to the sparse foreground 400 is computed iteratively. Very efficient algorithms exist to solve each of the sub-problems. As a non-limiting example and referring to process of identifying contiguous ROI 316 in FIG. 4, the segmentation sub-problem 402 (i.e., Equation (5)) is computed using the split-Bregman method for segmentation. Sub-problem 402 resembles an image segmentation problem; namely region detection. In this case, the segmentation sub-problem 402 is trying to find contiguous foreground regions from the sparse foreground data. This is solved, for example, by using an efficient image segmentation solver, which in this example is the split-Bregman algorithm specifically formulated for segmentation and as solved by Equation 5.

The split-Bregman method was described by T. Goldstein, X. Bresson, and S. Osher, in "Geometric applications of the split bregman method: Segmentation and surface reconstruction." J. Sci. Comput., 45(1-3):272-293, 2010, which is hereby incorporated by reference as though fully set forth herein.

Thereafter, the region descriptors are recomputed 404. The region descriptors are recomputed using Equation (4) as provided above. The values of $c_i$ in the definition of $f_2(e)$ in Equation (4) are computed using k-means. In each iteration, the k-means is computed on the set $e \ne 0$ after e has been computed.

Once the region descriptors are recomputed 404, the system then determines the CCCS Sparse Foreground 406 using Equation (8). There are a host of solvers that can efficiently compute minimizers of Equation (8), a non-limiting example of which includes the alternating direction method. The alternating direction method was described by J. Yang and Y. Zhang, in "Alternating direction algorithms for 11-problems in compressive sensing." SIAM J. Sci. Comput., 33(1):250-278, 2011, which is hereby incorporated by reference as though fully set forth herein. The process is repeated until a convergence condition is reached, at which point the contiguous sparse foreground is provided along to the foveated compressed sensing 318 process as illustrated in FIG. 3. The end result is a reconstructed foreground 320, which is displayed to the user for identification or provided to other systems for further processing. As a non-limiting example, the reconstructed foreground is an image in which the sparse component e is superimposed over the background template A. The sparse component can then be flagged by the system as an interesting object or intruder.

(4) Example Implementation

Provided below is a non-limiting example implementation of the low power surveillance system. It is to be understood that the example is provided for illustrative purposes only and that the invention is not intended to be limited thereto. FIG. 3 demonstrates the application of the CCCS model to the low-power foreground detection model. The video was recorded from a stationary camera and the low-rank background template is computed over 50 frames of resolution 256×320 over a large time period with a lot of foreground movement. The projection matrix onto the foreground was then $P_Q = I - A^T A$, where A is the low-rank portion of the 50 frames. The $l_1$ parameter was set to $\alpha = 10^{-3}$ and the CS matrix $\Phi$ is defined to subsample the image signal at 25%. Since the model is nonconvex (although the approach is coordinate-wise convex), a good initial value improves performance. The initial value in this example was the output of an unconstrained low-power foreground detection using the YALL1 algorithm. With this initial value, it was observed that very few iterations were required until convergence of the iteration scheme. Generally 3-5 iterations are sufficient, but in most cases just one iteration is required to obtain a solution almost identical to the minimizer.

A segmentation variable $\hat{u}$ was obtained prior to thresholding. The variable was computed with parameter ratio $\gamma/\lambda = 2$. In practice, almost all components of $\hat{u}$ settle at the boundary of [0,1] so thresholding affects only a small set of components. In the experiments, it was determined that the best results occur when the parameters $\alpha = 0.1v$ and $\gamma = 0.9v$ are balanced and v is varied. For the larger regularization parameter v, it was shown that the solution is sparser and also closer to piecewise constant, due to the stronger sparsity constraint and stronger shrinkage from the ridge regression term respectively. For the weaker regularizer, it was shown that the solution is less sparse but significantly sparser than the solution without the contiguity prior and not nearly as close to a piecewise constant approximation. For the strong regularizer, the foreground was restricted to the segmented region, while there was still some sparse signal outside the segmentation region for the weaker regularizer. For strong regularizers, one would expect the solution to be closer to a piecewise constant solution since the ridge regression term will shrink the solution towards the values of $c_i$. This is an artifact of how f(e) is modeled with constants in Equation (4). This can be partially mitigated by increasing the numbers of clusters N obtained from the k-means computation.

One of the great advantages of the CCCS approach over the prior art methods is its ability to prevent false alarms. Enforcing contiguity prevents isolated detections on the image domain caused by local changes in illumination of the background. Instead, the system maintains large contiguous detections that are more likely to be caused by occlusion of the background by a foreground object.

What is claimed is:

1. A low power surveillance system, the system comprising:
   one or more processors and a memory, the memory having executable instructions encoded thereon, such that upon execution of the instructions, the one or more processors performs operations of:
   receiving a series of frames from a camera, each frame having a background and a foreground;
   generating a background template from the series of frames;
   generating a foreground detection kernel;

receiving reduced image measurements of a new image frame of the scene, the new image frame having a background and a foreground;

detecting potential regions of interest (ROI) in the foreground of the new image frame;

determining initial region descriptors in the potential ROI in the foreground of the new image frame;

segmenting the initial region descriptors to generate a segmented region;

re-determining region descriptors from the segmented region;

determining a contiguous sparse foreground from the re-determined region descriptors by maximizing a smoothness and contiguous nature of a boundary of pixel regions of a set of foreground pixels, the contiguous sparse foreground being a contiguous ROI;

reconstructing the ROI using foveated compressive sensing to generate an image of an interesting object; and combining the interesting object image with the background template to generate a reconstructed foreground;

wherein determining the contiguous sparse foreground a contiguity-constrained compressive sensing (CCCS) model is applied that penalizes isolated pixels and favors contiguous ROIs according to the following:

$$\min_e \|\Phi e - y\|_2 + \alpha\|e\|_1 + \lambda\|S\|_{TV},$$

where S=supp(e) denotes support of a sparse component e and $\|S\|_{TV} = \Sigma_{i,j}|(\nabla S)_{i,j}|$ denotes a total variation of S, $\Phi$ denotes a measurement matrix, $\gamma = \Phi d$, where d denotes a single raw image, approximating S by a function f(e) according to the following:

$$\min_{e, u \in \{0,1\}} \frac{1}{2}\|\Phi e - y\|^2 + \alpha\|e\|_1 + \lambda\|u\|_{TV} + \gamma\langle 1 - u, f(e)\rangle,$$

where $f(e) = f_1(e) - f_2(e)$, where $f_1(e)$ penalizes e=0 and $f_2(e)$ penalizes e≠0.

2. The system as set forth in claim 1, wherein in determining a contiguous sparse foreground from the re-determined region descriptors, the contiguous sparse foreground is determined using an alternating direction method.

3. A low power surveillance system, the system comprising:

a camera;

one or more processors and a memory, the memory having executable instructions encoded thereon, such that upon execution of the instructions, the one or more processors performs operations of:

receiving a series of frames from the camera, each frame having a background and a foreground;

generating a background template from the series of frames;

generating a foreground detection kernel;

receiving reduced image measurements of a new image frame of the scene, the new image frame having a background and a foreground;

detecting potential regions of interest (ROI) in the foreground of the new image frame;

determining initial region descriptors in the potential ROI in the foreground of the new image frame;

segmenting the initial region descriptors to generate a segmented region;

re-determining region descriptors from the segmented region;

determining a contiguous sparse foreground from the re-determined region descriptors by maximizing a smoothness and contiguous nature of a boundary of pixel regions of a set of foreground pixels, the contiguous sparse foreground being a contiguous ROI;

reconstructing the ROI using foveated compressive sensing to generate an image of an interesting object; and combining the interesting object image with the background template to generate a reconstructed foreground;

wherein determining the contiguous sparse foreground a contiguity-constrained compressive sensing (CCCS) model is applied that penalizes isolated pixels and favors contiguous ROIs according to the following:

$$\min_e \|\Phi e - y\|_2 + \alpha\|e\|_1 + \lambda\|S\|_{TV},$$

where S=supp(e) denotes support of a sparse component e and $\|S\|_{TV} = \Sigma_{i,j}|(\nabla S)_{i,j}|$ denotes a total variation of S, $\Phi$ denotes a measurement matrix, $\gamma = \Phi d$, where d denotes a single raw image, and a and $\lambda$ represent regularization parameters;

approximating S by a function f(e) according to the following:

$$\min_{e, u \in \{0,1\}} \frac{1}{2}\|\Phi e - y\|^2 + \alpha\|e\|_1 + \lambda\|u\|_{TV} + \gamma\langle 1 - u, f(e)\rangle,$$

where $f(e) = f_1(e) - f_2(e)$, where $f_1(e)$ penalizes e=0 and $f_2(e)$ penalizes e≠0.

4. The system as set forth in claim 3, wherein in determining a contiguous sparse foreground from the re-determined region descriptors, the contiguous sparse foreground is determined using an alternating direction method.

5. A computer program product for providing low power surveillance, the computer program product comprising:

computer-readable instructions stored on a non-transitory computer-readable medium that are executable by a computer having one or more processors, such that upon execution of the instructions, the one or more processors perform the operations of:

receiving a series of frames from a camera, each frame having a background and a foreground;

generating a background template from the series of frames;

generating a foreground detection kernel;

receiving reduced image measurements of a new image frame of the scene, the new image frame having a background and a foreground;

detecting potential regions of interest (ROI) in the foreground of the new image frame;

determining initial region descriptors in the potential ROI in the foreground of the new image frame;
segmenting the initial region descriptors to generate a segmented region;
re-determining region descriptors from the segmented region;
determining a contiguous sparse foreground from the re-determined region descriptors by maximizing a smoothness and contiguous nature of a boundary of pixel regions of a set of foreground pixels, the contiguous sparse foreground being a contiguous ROI;
reconstructing the ROI using foveated compressive sensing to generate an image of an interesting object; and
combining the interesting object image with the background template to generate a reconstructed foreground;
wherein determining the contiguous sparse foreground a contiguity-constrained compressive sensing (CCCS) model is applied that penalizes isolated pixels and favors contiguous ROIs according to the following:

$$\min_e \|\Phi e - y\|_2 + \alpha \|e\|_1 + \lambda \|S\|_{TV},$$

where S=supp(e) denotes support of a sparse component e and $\|S\|_{TV} = \Sigma_{i,j}|(\nabla S)_{i,j}|$ denotes a total variation of S, $\Phi$ denotes a measurement matrix, $y=\Phi d$, where d denotes a single raw image, and $\alpha$ and $\lambda$ represent regularization parameters;
approximating S by a function f(e) according to the following:

$$\min_{e, u \in [0,1]} \frac{1}{2}\|\Phi e - y\|^2 + \alpha \|e\|_1 + \lambda \|u\|_{TV} + \gamma \langle 1 - u, f(e) \rangle,$$

where $f(e)=f_1(e)-f_2(e)$, where $f_1(e)$ penalizes e=0 and $f_2(e)$ penalizes e≠0.

6. The computer program product as set forth in claim 5, wherein in determining a contiguous sparse foreground from the re-determined region descriptors, the contiguous sparse foreground is determined using an alternating direction method.

7. A method for low power surveillance, the method comprising an act of:
causing one or more processors to execute instructions encoded on a non-transitory computer-readable medium, such that upon execution of the instructions, the one or more processors perform operations of:
receiving a series of frames from a camera, each frame having a background and a foreground;
generating a background template from the series of frames;
generating a foreground detection kernel;
receiving reduced image measurements of a new image frame of the scene, the new image frame having a background and a foreground;
detecting potential regions of interest (ROI) in the foreground of the new image frame;
determining initial region descriptors in the potential ROI in the foreground of the new image frame;
segmenting the initial region descriptors to generate a segmented region;
re-determining region descriptors from the segmented region;
determining a contiguous sparse foreground from the re-determined region descriptors by maximizing a smoothness and contiguous nature of a boundary of pixel regions of a set of foreground pixels, the contiguous sparse foreground being a contiguous ROI;
reconstructing the ROI using foveated compressive sensing to generate an image of an interesting object; and
combining the interesting object image with the background template to generate a reconstructed foreground;
wherein determining the contiguous sparse foreground a contiguity-constrained compressive sensing (CCCS) model is applied that penalizes isolated pixels and favors contiguous ROIs according to the following:

$$\min_e \|\Phi e - y\|_2 + \alpha \|e\|_1 + \lambda \|S\|_{TV},$$

where S=supp(e) denotes support of a sparse component e and $\|S\|_{TV} = \Sigma_{i,j}|(\nabla S)_{i,j}|$ denotes a total variation of S, $\Phi$ denotes a measurement matrix, $y=\Phi d$, where d denotes a single raw image, and $\alpha$ and $\lambda$ represent regularization parameters;
approximating S by a function f(e) according to the following:

$$\min_{e, u \in [0,1]} \frac{1}{2}\|\Phi e - y\|^2 + \alpha \|e\|_1 + \lambda \|u\|_{TV} + \gamma \langle 1 - u, f(e) \rangle,$$

where $f(e)=f_1(e)-f_2(e)$, where $f_1(e)$ penalizes e=0 and $f_2(e)$ penalizes e≠0.

8. The method as set forth in claim 7, wherein in determining a contiguous sparse foreground from the re-determined region descriptors, the contiguous sparse foreground is determined using an alternating direction method.

9. The system as set forth in claim 1, further comprising an operation of determining the measurement matrix based on the background template.

10. The system as set forth in claim 9, wherein in determining initial region descriptors in the potential ROI in the foreground of the new image frame, the initial region descriptors in the foreground of the new image frame are determined by convex optimization of the measurement matrix.

11. The system as set forth in claim 3, further comprising an operation of determining the measurement matrix based on the background template.

12. The system as set forth in claim 11, wherein in determining initial region descriptors in the potential ROI in the foreground of the new image frame, the initial region descriptors in the foreground of the new image frame are determined by convex optimization of the measurement matrix.

13. The computer program product as set forth in claim 5, further comprising instructions for causing the one or more processors to perform an operation of determining the measurement matrix based on the background template.

14. The computer program product as set forth in claim 13, wherein in determining initial region descriptors in the potential ROI in the foreground of the new image frame, the initial region descriptors in the foreground of the new image frame are determined by convex optimization of the measurement matrix.

15. The method as set forth in claim 7, further comprising an operation of determining the measurement matrix based on the background template.

16. The method as set forth in claim 15, wherein in determining initial region descriptors in the potential ROI in the foreground of the new image frame, the initial region descriptors in the foreground of the new image frame are determined by convex optimization of the measurement matrix.

17. The system as set forth in claim 1, wherein determining the contiguous sparse foreground is performed by maximizing at least three quantities.

18. The system as set forth in claim 1, wherein determining the contiguous sparse foreground is performed by maximizing at least three quantities using a split-variable correlation method.

19. The system as set forth in claim 3, wherein determining the contiguous sparse foreground is performed by maximizing at least three quantities.

20. The system as set forth in claim 3, wherein determining the contiguous sparse foreground is performed by maximizing at least three quantities using a split-variable correlation method.

21. The computer program as set forth in claim 5, wherein determining the contiguous sparse foreground is performed by maximizing at least three quantities.

22. The computer program product as set forth in claim 5, wherein determining the contiguous sparse foreground is performed by maximizing at least three quantities using a split-variable correlation method.

23. The method as set forth in claim 7, wherein determining the contiguous sparse foreground is performed by maximizing at least three quantities.

24. The method as set forth in claim 7, wherein determining the contiguous sparse foreground is performed by maximizing at least three quantities using a split-variable correlation method.

* * * * *